United States Patent
Chong et al.

(10) Patent No.: US 6,961,636 B1
(45) Date of Patent: Nov. 1, 2005

(54) METHOD AND APPARATUS FOR DYNAMICALLY MONITORING CONTROLLER TUNING PARAMETERS

(75) Inventors: Robert J. Chong, Austin, TX (US); Alexander J. Pasadyn, Austin, TX (US); Thomas J. Sonderman, Austin, TX (US)

(73) Assignee: Advanced Micro Devices Inc., Austin, TX (US)

( * ) Notice: Subject to any disclaimer, the term of this patent is extended or adjusted under 35 U.S.C. 154(b) by 603 days.

(21) Appl. No.: 10/126,172

(22) Filed: Apr. 19, 2002

Related U.S. Application Data (60) Provisional application No. 60/284,857, filed on Apr. 19, 2001.

(51) Int. Cl.[7] .................. G06F 19/00; G05B 13/02
(52) U.S. Cl. .................. 700/121; 700/30; 700/37; 700/38
(58) Field of Search ............... 700/30, 34, 37, 700/38, 39, 44, 45, 104, 108, 117, 121

(56) References Cited

U.S. PATENT DOCUMENTS

| | | | |
|---|---|---|---|
| 5,408,405 A | * | 4/1995 | Mozumder et al. ........... 700/31 |
| 5,926,690 A | * | 7/1999 | Toprac et al. ................. 438/17 |
| 6,161,054 A | * | 12/2000 | Rosenthal et al. .......... 700/121 |
| 6,263,255 B1 | * | 7/2001 | Tan et al. .................... 700/121 |
| 6,631,299 B1 | * | 10/2003 | Patel et al. .................... 700/37 |

OTHER PUBLICATIONS

Montgomery, D. C. (2000), *Design and Analysis of Experiments*. Response Surface Methods, 5th edition, John Wiley & Sons, New York, 11-6.

* cited by examiner

*Primary Examiner*—Paul Rodriguez
(74) *Attorney, Agent, or Firm*—Williams, Morgan & Amerson (57) ABSTRACT

A method includes processing a plurality of workpieces in accordance with an operating recipe. Metrology data associated with the processing is collected. A control model including at least one tuning parameter having a default value is provided. A plurality of perturbations is introduced to shift the tuning parameter from its default value. Control actions are generated based on the metrology data and the perturbations to the tuning parameter in the control model to modify the operating recipe. An error signal associated with each of the perturbations is generated. The default value of the tuning parameter is modified based on the error signals.

38 Claims, 4 Drawing Sheets

METHOD AND APPARATUS FOR DYNAMICALLY MONITORING CONTROLLER TUNING PARAMETERS

This application claims the benefit of Provisional Application No. 60/284,857, filed Apr. 19, 2001.

BACKGROUND OF THE INVENTION

1. Field of the Invention

This invention relates generally to the field of semiconductor device manufacturing and, more particularly, to a method and apparatus for dynamically monitoring controller tuning parameters.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process, various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability. Metrology data collected before, during (i.e., in-situ), or after the processing of a wafer or lot of wafers may be used to generate feedback and/or feedforward information for use in determining a control action for the previous process tool (i.e., feedback), the subsequent process tool (i.e., feedforward), or both.

Control actions are typically generated using a control model that incorporates one or more controller tuning parameters. Exemplary tuning parameters include gain factors that are applied to feedback or feedforward metrology data or weight factors that are applied to current and historical metrology data for data smoothing techniques. Values for the tuning parameters may be calculated or determined empirically. The efficacy of the process controller depends in great part on the optimization of the tuning parameters. It is difficult to conduct experiments to determine the effects of changing the tuning parameters on the performance of the controller. Due to the amount of time required, the extensive nature of the experimentation, and the fabrication resources required to perform such testing, it is typically cost prohibitive. Often, a change to one tuning parameter requires a corresponding change in another tuning parameter to optimize the process controller. This non-linear dependence between the tuning parameters is not easily modeled. Typical techniques for determining tuning parameters involve simulating the controller off-line, analyzing the error, and then running a passive controller on-line with the assumed optimal conditions to verify the results of the simulation. Although this technique is acceptable for detecting gross errors in the tuning parameters, it does not capture unmodeled, nonlinear behavior or plant-model mismatch.

The present invention is directed to overcoming, or at least reducing the effects of, one or more of the problems set forth above.

SUMMARY OF THE INVENTION

One aspect of the present invention is seen in a method including processing a plurality of workpieces in accordance with an operating recipe. Metrology data associated with the processing is collected. A control model including at least one tuning parameter having a default value is provided. A plurality of perturbations is introduced to shift the tuning parameter from its default value. Control actions are generated based on the metrology data and the perturbations to the tuning parameter in the control model to modify the operating recipe. An error signal associated with each of the perturbations is generated. The default value of the tuning parameter is modified based on the error signals.

Another aspect of the present invention is seen in a processing line including a process tool, at least one metrology tool, a process controller, and a tuning parameter controller. The process tool is configured to process a plurality of workpieces in accordance with an operating recipe. The metrology tool is configured to collect metrology data associated with the processing. The process controller is configured to implement a control model including at least one tuning parameter having a default value. The tuning parameter controller is configured to introduce a plurality of perturbations to shift the tuning parameter from its default value. The process controller is further configured to generate control actions based on the metrology data and the perturbations to the tuning parameter in the control model to modify the operating recipe. The tuning parameter controller is further configured to generate an error signal associated with each of the perturbations and modify the default value of the tuning parameter based on the error signals.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
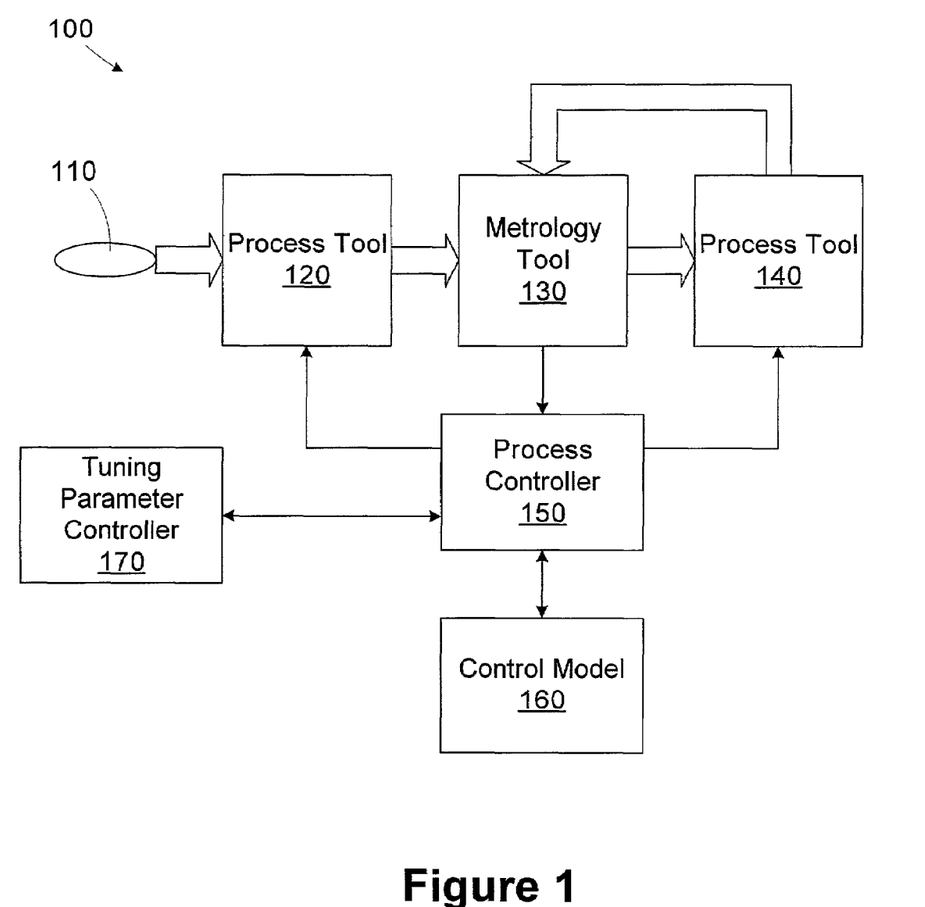
FIG. 1 is a simplified block diagram of a processing line in accordance with one illustrative embodiment of the present invention.

Referring now to FIG. 1, a simplified diagram of a portion of an illustrative processing line 100 for processing wafers 110 in accordance with the present invention is provided. The processing line 100 includes a first process tool 120, a metrology tool 130, a second process tool 140, and a process controller 150. The process controller 150 receives data from the metrology tool 130 and adjusts the operating recipe of one or both of the process tools 120, 140 to reduce variations in the characteristics of the processed wafers 110. The particular control actions taken by the process controller 150 depend on the particular processes performed by the process tools 120, 140, and the output characteristic measured by the metrology tool 130.

Although the invention is described as it may be implemented in a semiconductor fabrication facility, the invention is not so limited and may be applied to other manufacturing environments. The techniques described herein may be applied to a variety of workpieces including, but not limited to microprocessors, memory devices, digital signal processors, application specific integrated circuits (ASICs), or other similar devices. The techniques may also be applied to workpieces other than semiconductor devices.

The process controller 150 may use a control model 160 of the process tool 120, 140 being controlled to generate its control action. The control model 160 may be developed empirically using commonly known linear or non-linear techniques. The control model 160 may be a relatively simple equation based model (e.g., linear, exponential, weighted average, etc.) or a more complex model, such as a neural network model, principal component analysis (PCA) model, partial least squares projection to latent structures (PLS) model. The specific implementation of the control model 160 may vary depending on the modeling technique selected and the process being controlled. Using the control model 160, the process controller 150 may determine operating recipe parameters to reduce variation in the characteristics of the wafers 110 being processed.

In the illustrated embodiment, the process controller 150 is a computer programmed with software to implement the functions described. However, as will be appreciated by those of ordinary skill in the art, a hardware controller designed to implement the particular functions may also be used. Moreover, the functions performed by the process controller 150, as described herein, may be performed by multiple controller devices distributed throughout a system. Additionally, the process controller 150 may be a stand-alone controller, it may be resident on the metrology tool 130, or it may be part of a system controlling operations in an integrated circuit manufacturing facility. Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary information exchange and process control framework suitable for use in the processing line 100 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The control model 160 includes one or more tuning parameters that are used to generate the control action. Exemplary tuning parameters include gain factors that are applied to feedback or feedforward metrology data or weight factors that are applied to current and historical metrology data for data smoothing techniques. The following discussion illustrates exemplary control equations to show various tuning parameters.

In one illustrative example, the process tool 120 is an etch tool and the metrology tool 130 is configured to measure the depth of a trench formed by the etching process. A feedback control equation employed by the process controller 150 in accordance with the control model 160 for determining an etch time, $T_E$, is:

$$T_E = T_B + k_1 * (\text{Target Trench Depth} - \text{Measured Trench Depth}), \quad (1)$$

where $T_B$ is a base etch time corresponding to a default etch time value, $k_1$ is a tuning parameter, and the difference between the target depth of the trench and the measured depth of the trench reflects an error value. The gain constant, $k_1$, represents how aggressively the process controller 150 reacts to errors in the trench depth. Of course, feedback control equations may be more complicated and may include more than one tuning parameter. For example, in a classical process sense, a feedback control equation may include a proportional factor (as shown), an integral factor, and a derivative factor.

Figure 2A:
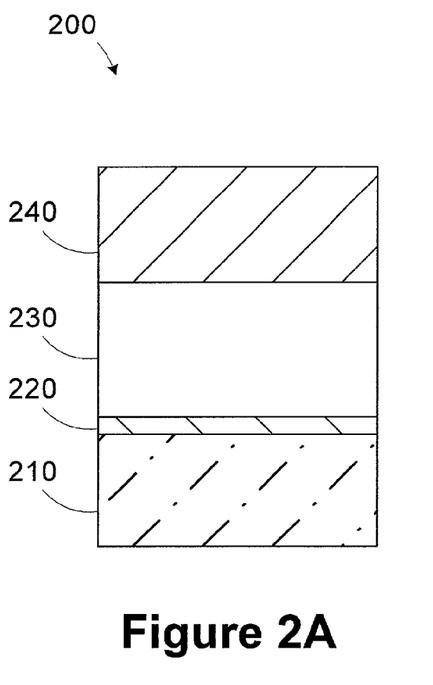
FIGS. 2A through 2C are cross-section views of an exemplary feature formed by the processing line of FIG. 1.
Figure 2B:
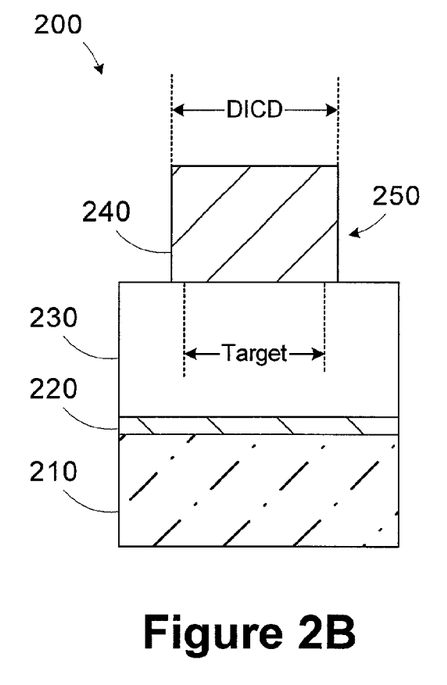
Figure 2C:
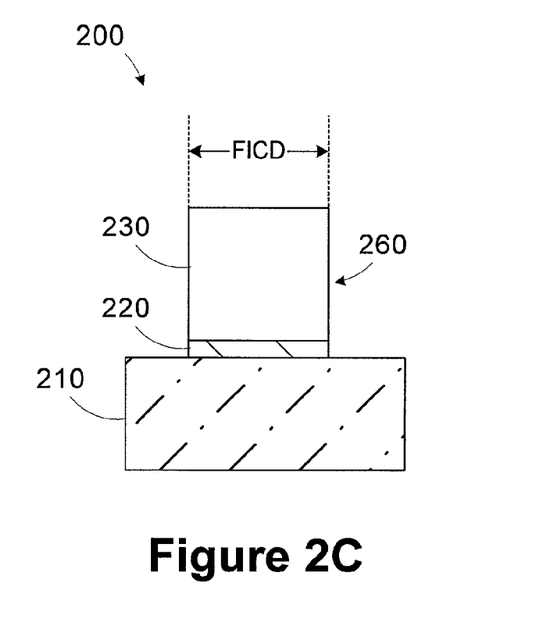

In another illustrative example, the process tool 120 may be a photolithography tool adapted to form a photoresist pattern over a process layer (e.g., a polysilicon layer used to form a transistor gate electrode), and the process tool 140 may be an etch tool. As shown in FIG. 2A, an exemplary semiconductor device 200 includes a substrate 210 on which a gate oxide layer 220 is formed. A polysilicon layer 230 is formed over the gate oxide layer 220, and a photoresist layer 240 is formed over the polysilicon layer 230. As seen in FIG. 2B, the photoresist layer 240 is patterned to define a photoresist line 250. The width of the photoresist line 250 is measured prior to etching to generate a development inspection critical dimension (DICD) measurement. A gate trim etch is performed by the process tool 140 to reduce the width of the photoresist line 250 to match a target line width. As shown in FIG. 2C, the photoresist line 250 is used as a mask for a subsequent etch process performed by the process tool 140 to form a transistor gate electrode stack 260, and the photoresist line 250 is removed. Subsequently, the transistor gate electrode stack 260 is measured (e.g., routed back to the metrology tool 130 or measured by a different metrology tool (not shown)) to generate a final inspection critical dimension (FICD). An exemplary technique for performing a gate trim etch is described in greater detail in U.S. Pat. No. 6,110,785, entitled "FORMULATION OF HIGH PERFORMANCE TRANSISTORS USING GATE TRIM ETCH PROCESS," and incorporated herein by reference in its entirety.

The DICD measurement is used by the process controller 150 as feedforward information for determining an etch time. The FICD measurement taken after the etch process may be used to update the state of the control model 160. The control model 160 employed by the process controller 150 may use the following state equation:

$$\text{State} = FICD - \text{gamma} * DICD - \text{alpha} * TrimTime, \quad (2)$$

where gamma is a tuning parameter applied to the feedforward DICD measurement and alpha represents the historical etch rate of the process tool 140. The DICD of an incoming wafer is measured and the state equation is solved by the process controller 150 for the trim time to apply to the incoming wafer. Following the etch process, the FICD value is determined and substituted into Equation 2, and it is solved for the current State value. The FICD measurement may also be used to update the alpha parameter.

To reduce the effects of noise in the control equation, a smoothing technique may be applied to the updating of the State parameter. For example, an exponentially weighted moving average technique may be used in accordance with the following equation:

$$Z_i = \lambda \cdot X_i + (1-\lambda) \cdot Z_{i-1} \quad i=1,2,\ldots,n \quad (3)$$

where $Z_i$ is the ith EWMA, $X_i$ is the ith observation, $Z_0$ is the average from the historical data, and $0 < \lambda < 1$. The EWMA is applied to the State parameter above in Equation 2. The $\lambda$ parameter is a tuning parameter that determines the relative contribution of the current observation versus that of the previous average. If the confidence in the accuracy of the current measurement is relatively high, $\lambda$ is set closer to one.

The preceding examples are provided to illustrate various tuning parameters that may be used in the control model 160. However, the application of the present invention is not limited to these particular tuning parameters. Other control schemes may employ different models with different associated tuning parameters, and the present invention applies to these implementations as well.

Referring back to FIG. 1, the processing line 100 further includes a tuning parameter controller 170 configured to interface with the process controller 150 for changing the tuning parameters employed in conjunction with the control model 160. In the illustrated embodiment the tuning parameter controller 170 implements an Evolutionary Operation (EVOP) technique for introducing controlled perturbations into the tuning parameters over time to seek to improve the performance of the process controller 150 by identify more effective operating points. The functions described for the tuning parameter controller 170 may by performed automatically, or alternatively, based on operator or engineering manual intervention.

Figure 3:
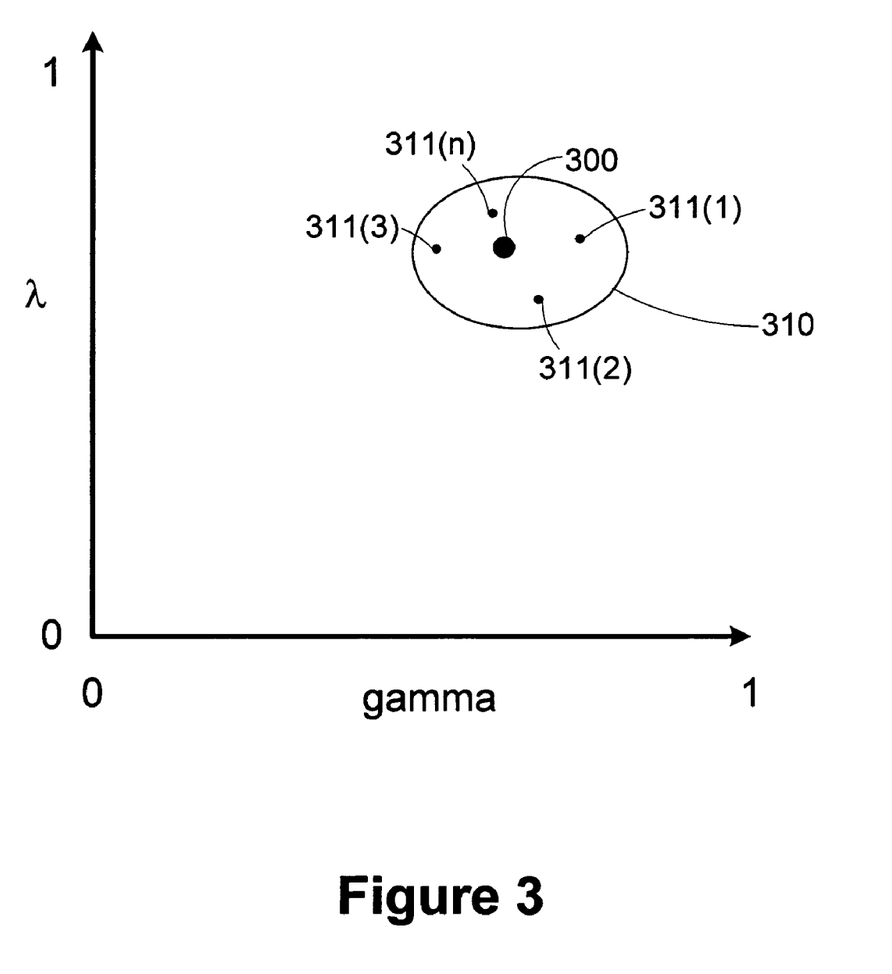
FIG. 3 is a diagram illustrating operating points for tuning parameters used in a control model.

FIG. 3 is a diagram illustrating tuning parameters that may be used in the control model 160. The point 300 represents a current operating point for the tuning parameters. In the example illustrated in FIG. 3, tuning parameters for gamma in equation 2 and $\lambda$ in equation 3 are shown. Other implementations may vary more or less tuning parameters. The tuning parameter controller 170 defines a locus 310 of tuning parameter operating points including the current operating point 300.

Within the locus 310 of tuning parameter operating points, the tuning parameter controller 170 introduces perturbations to the current operating point 300 to generate operating points 311(1)–311(n). The magnitude of the perturbations introduced into the current operating point 300 may vary depending on the particular implementation. The tuning parameter controller 170 then selects one of the operating points 311(1)–311(n) and communicates the associated tuning parameter settings to the process controller 150 for configuring the control model 160. After the process controller 150 operates for a predetermined time period at the selected operating point 311(1)–311(n), the tuning parameter controller 170 selects another one of the operating points 311(1)–311(n) and instructs the process controller 150 to reconfigure the control model 160. This iterative process continues until all the desired operating points 311(1)–311(n) have been tested. The time period selected for each iteration depends on the particular implementation and the amount of data that is required to generate a statistically valid sample. Exemplary time periods include one shift, one day, one week, one or more months, etc.

The FICD measurements collected for the processed wafers 110 are then used to generate error signals for each of the operating points 300, 311(1)–311(n). The collection of error signals may be referred to as a response surface that demonstrates the effectiveness of the various operating points 311(1)–311(n) in comparison to the current operating point 300. The response surface may then be used to identify potential tuning parameter settings that result in a more effective control model 160. If one of the operating points 311(1)–311(n) has an error signal that indicates it is performing better than the current operating point 300, the current operating point may be shifted to the new set of tuning parameters. This shifting may be performed manually by an operator or automatically by the tuning parameter controller 170. The procedure may then be repeated with the new tuning parameter settings to further refine or adapt the control model 160.

In analyzing the error data, wafers 110 with like characteristics (product type, process step) may be grouped to reduce the number of independent variables. For example, the error performance at one of the operating points 311(1)–311(n) may be first analyzed for all wafers processed 110. Then the error data may be broken down by product type and/or process step to determine if the error performance is consistent across these subsets.

Figure 4:
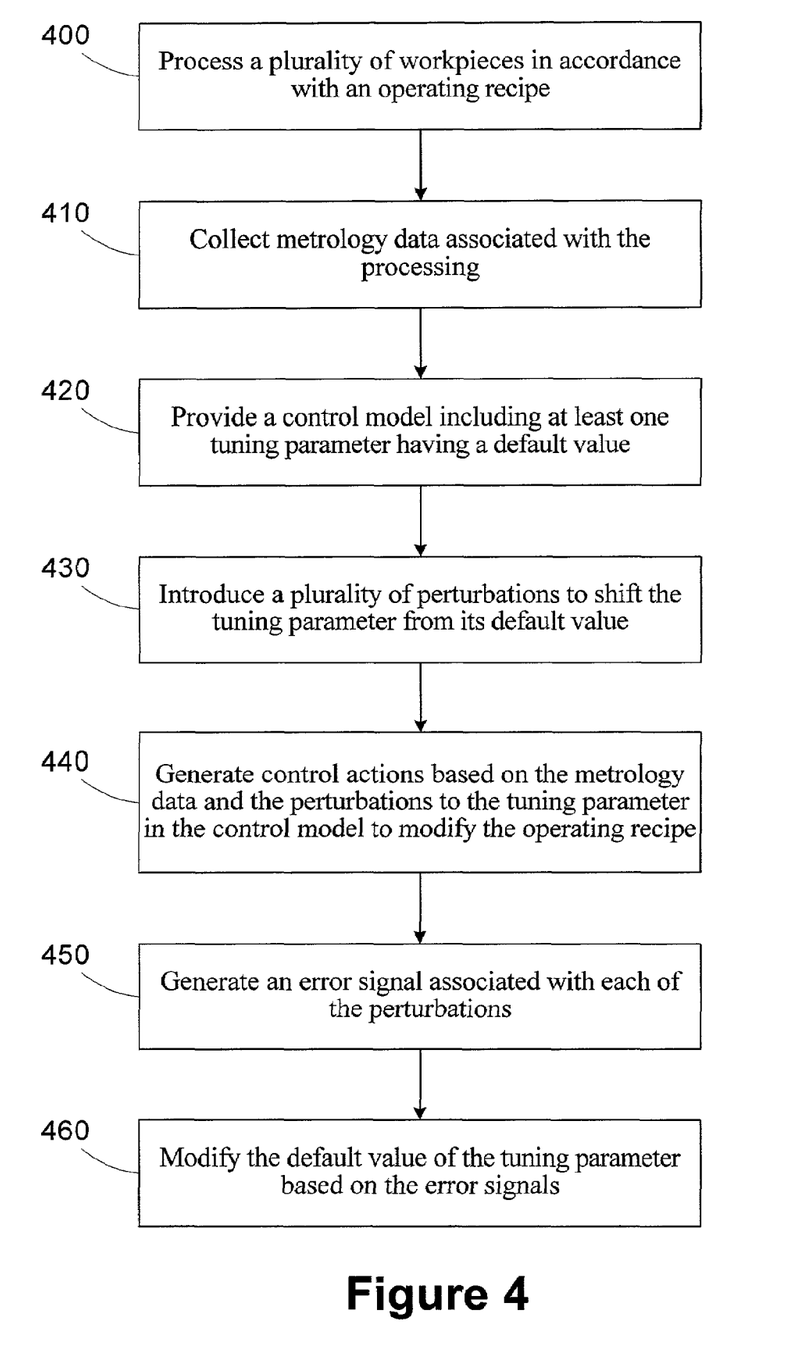
FIG. 4 is a simplified block diagram of a method for controlling a process in accordance with another illustrative embodiment of the present invention.

Turning now to FIG. 4, a simplified flow diagram of a method for dynamically monitoring controller tuning parameters in accordance with another embodiment of the present invention is provided. In block 400, a plurality of workpieces is processed in accordance with an operating recipe. In block 410, metrology data associated with the processing is collected. In block 420, a control model including at least one tuning parameter having a default value is provided. In block 430, a plurality of perturbations is introduced to shift the tuning parameter from its default value. In block 440, control actions are generated based on the metrology data and the perturbations to the tuning parameter in the control model to modify the operating recipe. In block 450, an error signal associated with each of the perturbations is generated. In block 460, the default value of the tuning parameter is modified based on the error signals.

Employing an evolutionary operation technique to increase the effectiveness of the control model employed for automatic process control has several advantages. Data for improving the effectiveness of the control model may be gathered on-line while products are actually being manufactured. This reduces the need for expensive test wafers. Improving the performance of the control model reduces variation in the manufactured products, thus increasing the profitability and efficiency of the processing line.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   processing at least one workpiece in accordance with an operating recipe;
   collecting metrology data associated with the processing;
   providing a control model including at least one tuning parameter having a default value;
   introducing a plurality of perturbations to shift the tuning parameter from its default value;
   generating control actions based on the metrology data and the perturbations to the tuning parameter in the control model to modify the operating recipe;
   generating an error signal associated with each of the perturbations and the modified operating recipe; and
   modifying the default value of the tuning parameter based on the error signals.

2. The method of claim 1, wherein providing the control model further comprises providing a feedback tuning parameter.

3. The method of claim 1, wherein providing the control model further comprises providing a feedforward tuning parameter.

4. The method of claim 1, wherein providing the control model further comprises providing a smoothing tuning parameter.

5. The method of claim 1, wherein the default value of the tuning parameter defines a current operating point and introducing the plurality of perturbations further comprises generating a plurality of operating points offset from the current operating point.

6. The method of claim 5, wherein generating the plurality of operating points offset from the current operating point further comprises:
   defining a locus of operating points proximate the current operating point; and selecting the operating points from the locus of operating points.

7. The method of claim 5, wherein generating the error signals further comprises generating error signals for each of the operating points.

8. The method of claim 1, wherein the control model includes a plurality of tuning parameters, each having a default value, and introducing the plurality of perturbations further comprises introducing perturbations to a subset of the tuning parameters.

9. The method of claim 1, wherein introducing the plurality of perturbations further comprises introducing each of the perturbations for a predetermined time interval.

10. A method, comprising:
forming a photoresist line above a process layer on each of a plurality of wafers;
measuring a first critical dimension of the photoresist line for at least a subset of the wafers;
etching the photoresist line on each of the wafers in accordance with an operating recipe;
providing a control model including at least one tuning parameter having a default value;
introducing a plurality of perturbations to shift the tuning parameter from its default value;
generating control actions for updating the operating recipe based on the first critical dimension measurements and the perturbations to the tuning parameter in the control model to modify the operating recipe;
generating an error signal associated with each of the perturbations and the modified operating recipe; and
modifying the default value of the tuning parameter based on the error signals.

11. The method of claim 10, wherein providing the control model further comprises providing a feedforward tuning parameter for applying to the first critical dimension measurements.

12. The method of claim 10, wherein providing the control model further comprises providing a smoothing tuning parameter.

13. The method of claim 10, wherein the default value of the tuning parameter defines a current operating point and introducing the plurality of perturbations further comprises generating a plurality of operating points offset from the current operating point.

14. The method of claim 13, wherein generating the plurality of operating points offset from the current operating point further comprises:
defining a locus of operating points proximate the current operating point; and
selecting the operating points from the locus of operating points.

15. The method of claim 13, wherein generating the error signals further comprises generating error signals for each of the operating points.

16. The method of claim 10, wherein the control model includes a plurality of tuning parameters, each having a default value, and introducing the plurality of perturbations further comprises introducing perturbations to a subset of the tuning parameters.

17. The method of claim 16, wherein providing the control model further comprises providing a feedforward tuning parameter for applying to the first critical dimension measurements and a smoothing tuning parameter in the plurality of tuning parameters.

18. The method of claim 10, wherein introducing the plurality of perturbations further comprises introducing each of the perturbations for a predetermined time interval.

19. A processing line, comprising:
a process tool configured to process a plurality of workpieces in accordance with an operating recipe;
at least one metrology tool configured to collect metrology data associated with the processing;
a process controller configured to implement a control model including at least one tuning parameter having a default value; and
a tuning parameter controller configured to introduce a plurality of perturbations to shift the tuning parameter from its default value, wherein the process controller is further configured to generate control actions based on the metrology data and the perturbations to the tuning parameter in the control model to modify the operating recipe, and the tuning parameter controller is further configured to generate an error signal associated with each of the perturbations and the modified operating recipe and modify the default value of the tuning parameter based on the error signals.

20. The processing line of claim 19, wherein the tuning parameter further comprises a feedback tuning parameter.

21. The processing line of claim 19, wherein the tuning parameter further comprises a feedforward tuning parameter.

22. The processing line of claim 19, wherein the tuning parameter further comprises a smoothing tuning parameter.

23. The processing line of claim 19, wherein the default value of the tuning parameter defines a current operating point and the tuning parameter controller is further configured to generate a plurality of operating points offset from the current operating point.

24. The processing line of claim 23, wherein the tuning parameter controller is further configured to define a locus of operating points proximate the current operating point and select the operating points from the locus of operating points.

25. The processing line of claim 23, wherein the tuning parameter controller is further configured to generate error signals for each of the operating points.

26. The processing line of claim 19, wherein the control model includes a plurality of tuning parameters, each having a default value, and the tuning parameter controller is further configured to introduce perturbations to a subset of the tuning parameters.

27. The processing line of claim 19, wherein the tuning parameter controller is further configured to introduce each of the perturbations for a predetermined time interval.

28. A processing line, comprising:
a photolithography tool configured to form a photoresist line above a process layer on each of a plurality of wafers;
a first metrology tool configured to measure a first critical dimension of the photoresist line for at least a subset of the wafers;
an etch tool configured to etch the photoresist line on each of the wafers in accordance with an operating recipe;
a process controller configured to implement a control model including at least one tuning parameter having a default value to generate control actions for updating the operating recipe based on at least the first critical dimension measurements; and
a tuning parameter controller configured to introduce a plurality of perturbations to shift the tuning parameter from its default value, wherein the process controller is further configured to generate the control actions based on the first critical dimension measurements and the perturbations to the tuning parameter in the control model to modify the operating recipe, and the tuning parameter controller is further configured to generate an error signal associated with each of the perturbations and the modified operating recipe and modify the default value of the tuning parameter based on the error signals.

29. The processing line of claim 28, wherein the tuning parameter further comprises a feedforward tuning parameter applied to the first critical dimension measurements.

30. The processing line of claim 28, wherein the tuning parameter further comprises a smoothing tuning parameter.

31. The processing line of claim 28, wherein the default value of the tuning parameter defines a current operating point and the tuning parameter controller is further configured to generate a plurality of operating points offset from the current operating point.

32. The processing line of claim 31, wherein the tuning parameter controller is further configured to define a locus of operating points proximate the current operating point and select the operating points from the locus of operating points.

33. The processing line of claim 31, wherein the tuning parameter controller is further configured to generate error signals for each of the operating points.

34. The processing line of claim 28, wherein the control model includes a plurality of tuning parameters, each having a default value, and the tuning parameter controller is further configured to introduce perturbations to a subset of the tuning parameters.

35. The processing line of claim 34, wherein a first one of the tuning parameters further comprises a feedforward tuning parameter applied to the first critical dimension measurements, and a second one of the plurality of tuning parameters further comprises a smoothing tuning parameter.

36. The processing line of claim 28, wherein the tuning parameter controller is further configured to introduce each of the perturbations for a predetermined time interval.

37. A processing line, comprising:
means for processing at least one workpiece in accordance with an operating recipe;
means for collecting metrology data associated with the processing;
means for providing a control model including at least one tuning parameter having a default value;
means for introducing a plurality of perturbations to shift the tuning parameter from its default value;
means for generating control actions based on the metrology data and the perturbations to the tuning parameter in the control model to modify the operating recipe;
means for generating an error signal associated with each of the perturbations and the modified operating recipe; and
means for modifying the default value of the tuning parameter based on the error signals.

38. A processing line, comprising:
means for forming a photoresist line above a process layer on each of a plurality of wafers;
means for measuring a first critical dimension of the photoresist line for at least a subset of the wafers;
means for etching the photoresist line on each of the wafers in accordance with an operating recipe;
means for providing a control model including at least one tuning parameter having a default value;
means for introducing a plurality of perturbations to shift the tuning parameter from its default value;
means for generating control actions for updating the operating recipe based on the first critical dimension measurements and the perturbations to the tuning parameter in the control model to modify the operating recipe;
means for generating an error signal associated with each of the perturbations and the modified operating recipe; and
means for identifying the default value of the tuning parameter based on the error signals.

* * * * *